(12) United States Patent
Kim

(10) Patent No.: US 6,480,225 B1
(45) Date of Patent: Nov. 12, 2002

(54) SURVEILLANCE SYSTEM AND METHOD USING PERSONAL COMPUTER

(75) Inventor: Bong-seok Kim, Goyang (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/257,180

(22) Filed: Feb. 25, 1999

(30) Foreign Application Priority Data

Feb. 25, 1998 (KR) .............................. 98-5960

(51) Int. Cl.[7] .............................. H04N 7/18; H04N 9/47
(52) U.S. Cl. .............................. 348/143; 348/154
(58) Field of Search .............................. 348/153, 154, 348/143, 155; 345/112; 382/103

(56) References Cited

U.S. PATENT DOCUMENTS

| | | | |
|---|---|---|---|
| 3,825,676 A | | 7/1974 | Ramsden, Jr. |
| 5,134,472 A | | 7/1992 | Abe |
| 5,289,275 A | * | 2/1994 | Ishii et al. .............. 348/154 |
| 5,588,067 A | | 12/1996 | Peterson et al. |
| 5,666,157 A | | 9/1997 | Aviv |
| 5,703,618 A | * | 12/1997 | Eglit .............. 345/112 |
| 5,751,346 A | * | 5/1998 | Dozier et al. .............. 348/153 |
| 5,880,775 A | * | 3/1999 | Ross .............. 348/143 |
| 6,067,169 A | * | 5/2000 | Ohnishi .............. 358/1.9 |
| 6,185,314 B1 | * | 2/2001 | Crabtree et al. .............. 382/103 |

OTHER PUBLICATIONS

Gonzalez, Rafael C., digital image processing, 1992, addison–wesley publishing company, 221–230.*

* cited by examiner

Primary Examiner—Chris Kelley
Assistant Examiner—Behrooz Senfi
(74) Attorney, Agent, or Firm—Robert E. Bushnell, Esq.

(57) ABSTRACT

A surveillance system and method are disclosed. Two images that occur at a certain time apart are captured. The luminance of each pixel for each image is determined. The change in luminance for each pixel is determined. The number of pixels whose change in luminance exceeds a first threshold is calculated. If this number of pixels exceeding a first threshold exceeds a second threshold, the image is stored as the image has sufficiently changed. Since the present image is stored when there is a movement in the present image compared with the previous image, the cost for storing image data is low. Further, when there is a movement, since the time intervals for capturing images are adjusted according to the extent of the movement, the surveillance operation can be carried out effectively.

3 Claims, 4 Drawing Sheets

SURVEILLANCE SYSTEM AND METHOD USING PERSONAL COMPUTER

CLAIM OF PRIORITY

This application makes reference to, incorporates the same herein, and claims all benefits accruing under 35 U.S.C. §119 arising from an application for a SURVEILLANCE SYSTEM AND METHOD earlier filed in the Korean Industrial Property Office on Feb. 25, 1998 and there duly assigned Ser. No. 5960/1998.

1. Field of the Invention

The present invention relates to a surveillance system and method, and more particularly, to a surveillance system and method in which a surrounding area can be observed using a personal computer equipped with a capture board for capturing an image.

2. Description of the Related Art

An earlier surveillance system comprises a camera installed in a surveillance area, and a closed circuit television (hereinafter referred to as CCTV) with which a guard observes the surveillance area. U.S. Pat. No. 3,825,676 to Ramsden, Jr discloses a Surveillance System using a closed circuit television. Two distinct measurements of a video signal are made. The first measurement is stored. The second measurement is made and compared with the stored measurement. Any difference in excess of a predetermined threshold is indicative of motion of an object within the viewing range. If motion has occurred, an alarm is set off.

U.S. Pat. No. 5,588,067 for a Motion Detection and Image Acquisition Apparatus and Method of Detecting the Motion of and Acquiring an Image of an Object to Peterson et al discloses a device that compares the current image to the previously saved image and calculates a motion vector. If the motion vector is more than a threshold, the current image is saved on microfiche.

However, the prior art does not disclose a pixel by pixel comparison of the luminance differences between a pair of images to determine whether the current image should be saved. Also, there is no indication from the prior art that the time interval between images is adjusted depending on whether or not a current image has just been saved. It is desirable to accomplish these tasks without the use of a video tape recorder so as to save on the amount of equipment used to achieve the image comparison process and the image storage process.

SUMMARY OF THE INVENTION

To solve the above problems, it is an object of the present invention to provide a surveillance system and method by which a surveillance area is observed by using a personal computer having an image capture board which is connected to a camera unit and receives images therefrom.

Accordingly, to achieve the above objective, there is provided a surveillance system including: a camera unit; and a surveillance unit connected to the camera unit for storing an image received from the camera unit when the luminance of pixels of the current image received from the camera are compared to the luminance of corresponding pixels of the previously received image and the number of pixels where the change in luminance exceeds a first threshold are counted and it is determined that the number of counted pixels that have a change in luminance that exceeds a first threshold exceeds a second threshold.

To achieve the above objective, there is provided a surveillance method including the steps of: capturing images from a camera at a predetermined time interval; calculating luminance values of pixels in the captured image; comparing the luminance of pixels from the captured image with the luminance of corresponding pixels from the previous image and storing the captured image if the number of pixels in the captured image that have a luminance that differs more than a first predetermined value from corresponding pixels of the previous image exceeds a second predetermined value.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
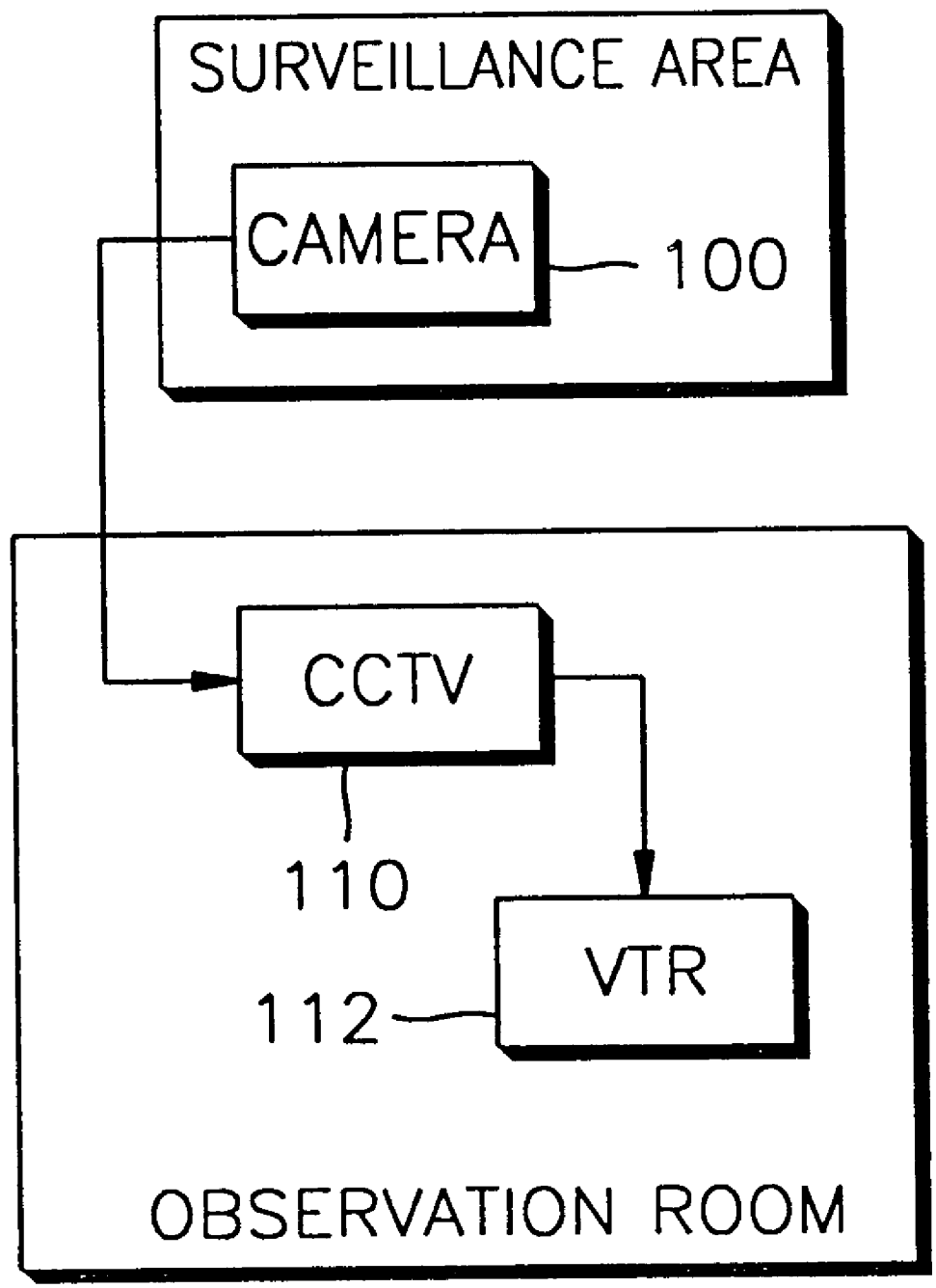
FIG. 1 is a block diagram illustrating an earlier surveillance system.

FIG. 1 is a block diagram of an earlier surveillance system. The surveillance system of FIG. 1 is composed of a camera 100 installed in a surveillance area, a CCTV 110 installed in an observation room and connected to the camera 100, and a video tape recorder connected to the CCTV for storing video footage displayed on the CCTV 110. The video tape recorder 112 is for recording video footage when the guard is absent.

Figure 2A:
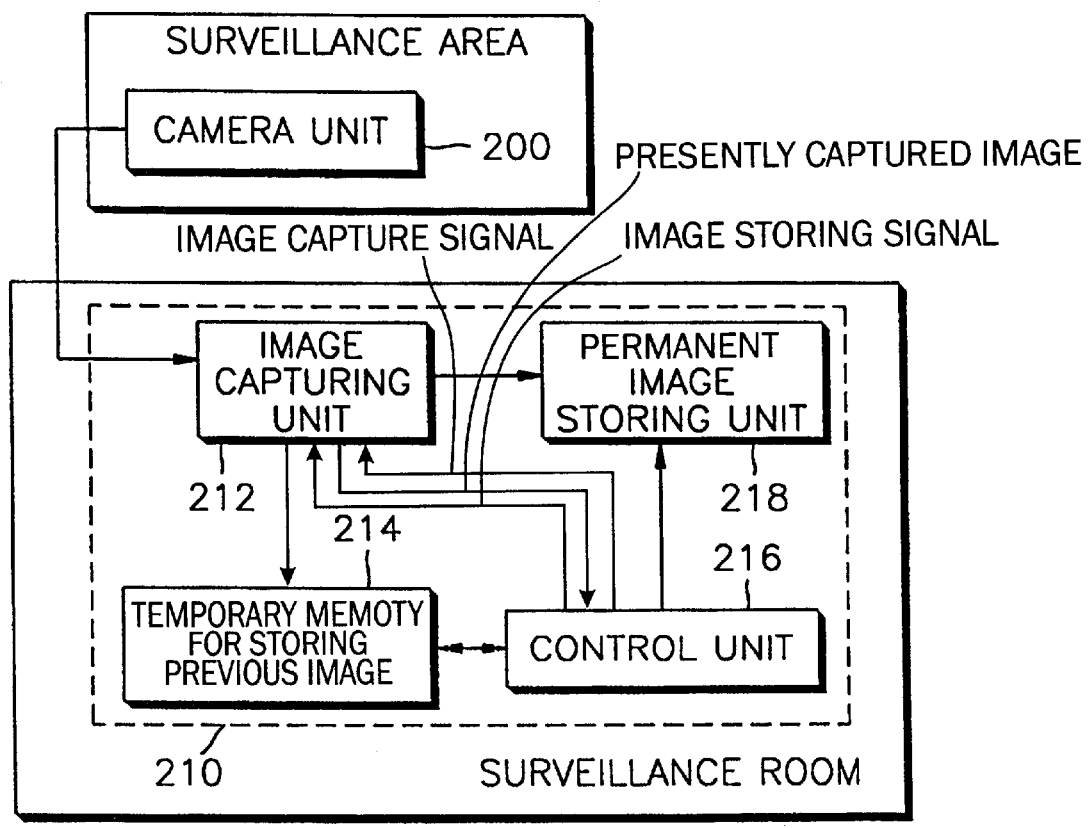
FIG. 2A is a block diagram illustrating a surveillance system according to the present invention.

FIG. 2A is a block diagram of a surveillance system using a personal computer according to the present invention. The surveillance system shown in FIG. 2A includes a camera unit 200 installed in a surveillance area, and a surveillance unit 210 comprising an image capturing unit 212, a temporary previous image storing unit 214, a control unit 216, and a permanent image storing unit 218. The temporary previous image storing unit 214 is a temporary storage unit used only to compare the luminance of pixels within it with the luminance of corresponding pixels of a subsequently captured image. Images in storage unit 214 are overwritten and thus lost each time a new image is captured. In contrast, permanent image storing unit 218 is a form of permanent storage for selected images and can be part of a hard disk in a computer system. The camera unit 200 includes a camcorder, or a small camera for a computer employing charge coupled devices, and supplies images of the surveillance area to the surveillance unit 210.

The surveillance unit 210 may be, for example, a personal computer comprising a capture board for capturing an image, a hard disk storing selected images stored in permanent storage 218 for later review and scrutiny, and a processor for controlling the whole computer system. The surveillance unit 210 is installed in a surveillance room. The image capturing unit 212 periodically gets an image from the camera unit 200 at a time interval decided by the control unit 216. A captured image by image capturing unit 212 is relayed to control unit 216 for calculation of luminance values with a previously stored image found in temporary memory 214. The control unit 216 calculates luminance values from R (red), G (green) and B (blue) values of pixels of the image captured by the image capturing unit 212, and calculates differences between the found luminance values and those of the corresponding pixels of the previous image stored in the temporary previous image storing unit 214. The luminance calculation of pixels may be performed only on pixels selected by a user at the discretion of the user or may include calculation of luminance of every pixel. When the number of pixels which have differences in luminance between the presently captured image and the previous image stored in temporary memory 214 exceeds a first predetermined value exceeds a second predetermined value, the captured image is then also stored in permanent memory 218. Regardless of whether the captured image is permanently stored or not, each captured image is temporarily stored in temporary storage 214 directly from image capturing unit 212. Upon storing an image in temporary storage 214, any previous image stored in temporary storage 214 is overwritten.

Figure 2B:
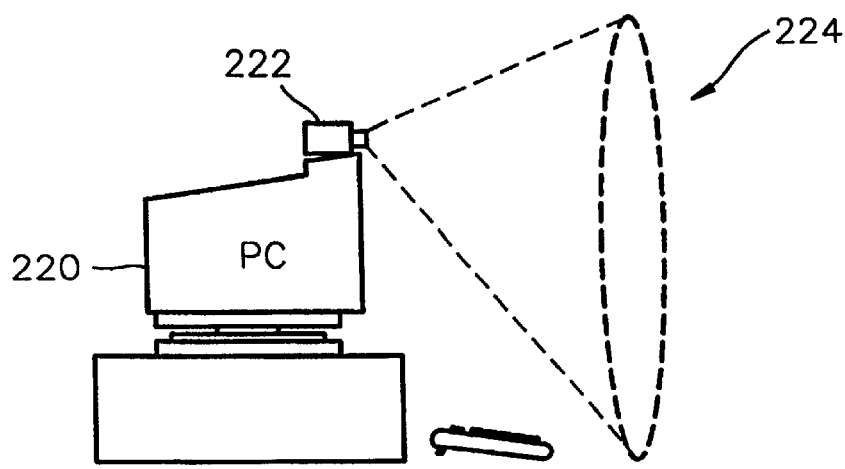
FIG. 2B is a side view of the surveillance system illustrated in FIG. 2A.

FIG. 2B is a side view of a physically installed example of the surveillance system illustrated in FIG. 2A, and shows a configuration of the surveillance system in which a camera 222 is installed. Numeral 224 indicates the observable scope 224 of the camera 222. As described above, a surveillance unit 220 compares a present image with a temporarily stored previous image, and stores the present image in both temporary memory 214 and in a permanent memory 218 when a moving object appears such as an intruder in the present image, and therefore the area within the observable scope 224 can be under surveillance.

Figure 3:
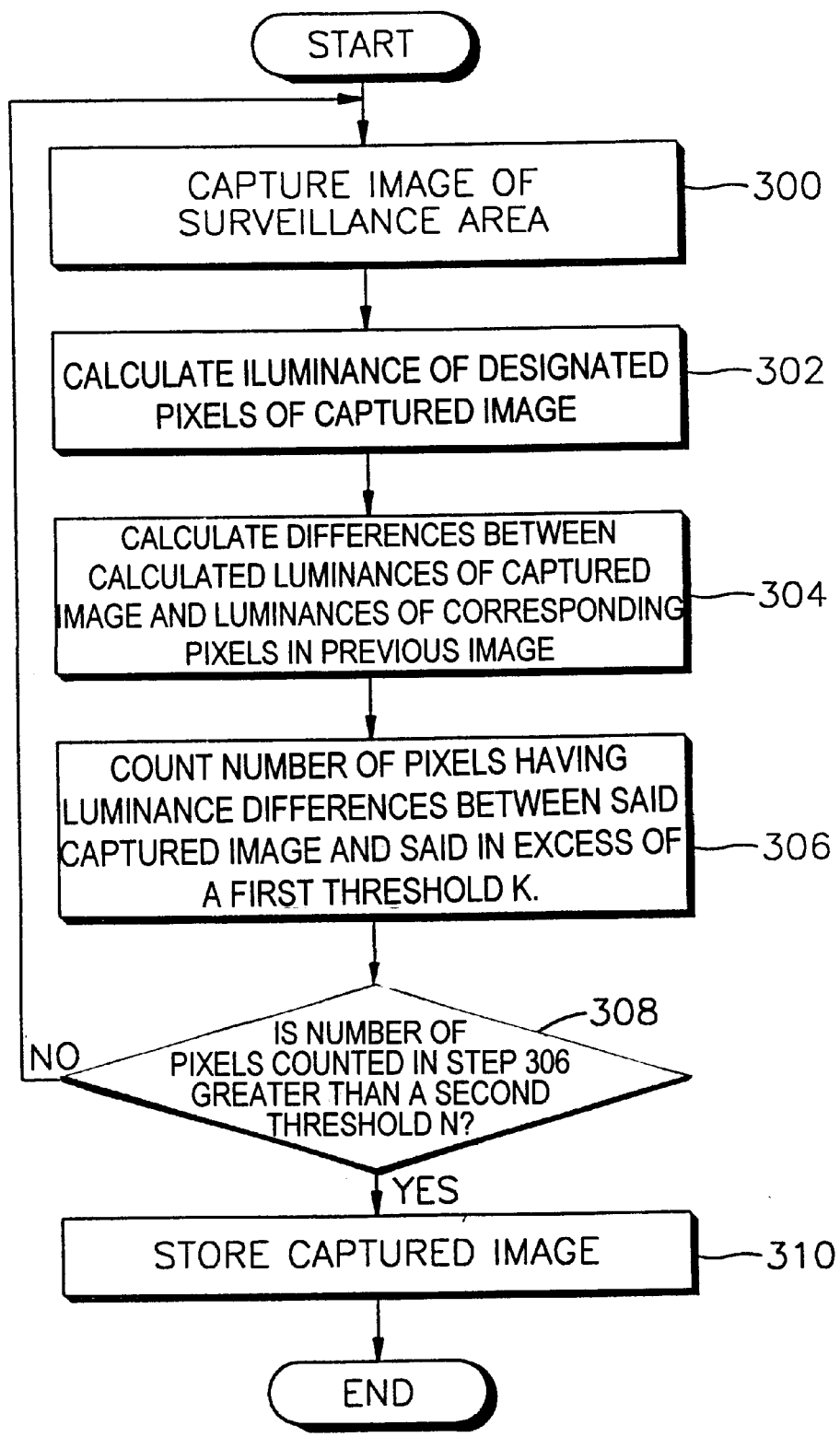
FIG. 3 is a flow chart illustrating a surveillance method according to the present invention.

FIG. 3 is a flow chart illustrating a surveillance method using a personal computer according to the present invention, and shows the steps of processing an image captured by a camera. The operation of a surveillance system according to the present invention is described in detail with reference to the flow chart of FIG. 3.

First, an image of the area within the observable scope is captured (step 300). Luminance values Y are calculated from the R, G and B values of selected pixels of the captured image by the following formula (step 302):

$$Y=0.299R+0.587G+0.114B$$

Differences between the calculated luminance values and those of the corresponding selected pixels of the previous image are calculated (step 304). Pixels each having a calculated luminance difference larger than a first predetermined value k are counted (step 306). When the number of counted pixels in step 306 is less than or equal to a second predetermined number N, the current image captured is not permanently saved and the duration in time between capturing images is set to $t_1$ (step 308 and step 402). When the number of pixels in step 306 is greater than the second predetermined number N, the current image captured is stored and the duration in time between capturing images is set to $t_2$ which is less than $t_1$ (Step 310 and step 404).

Figure 4:
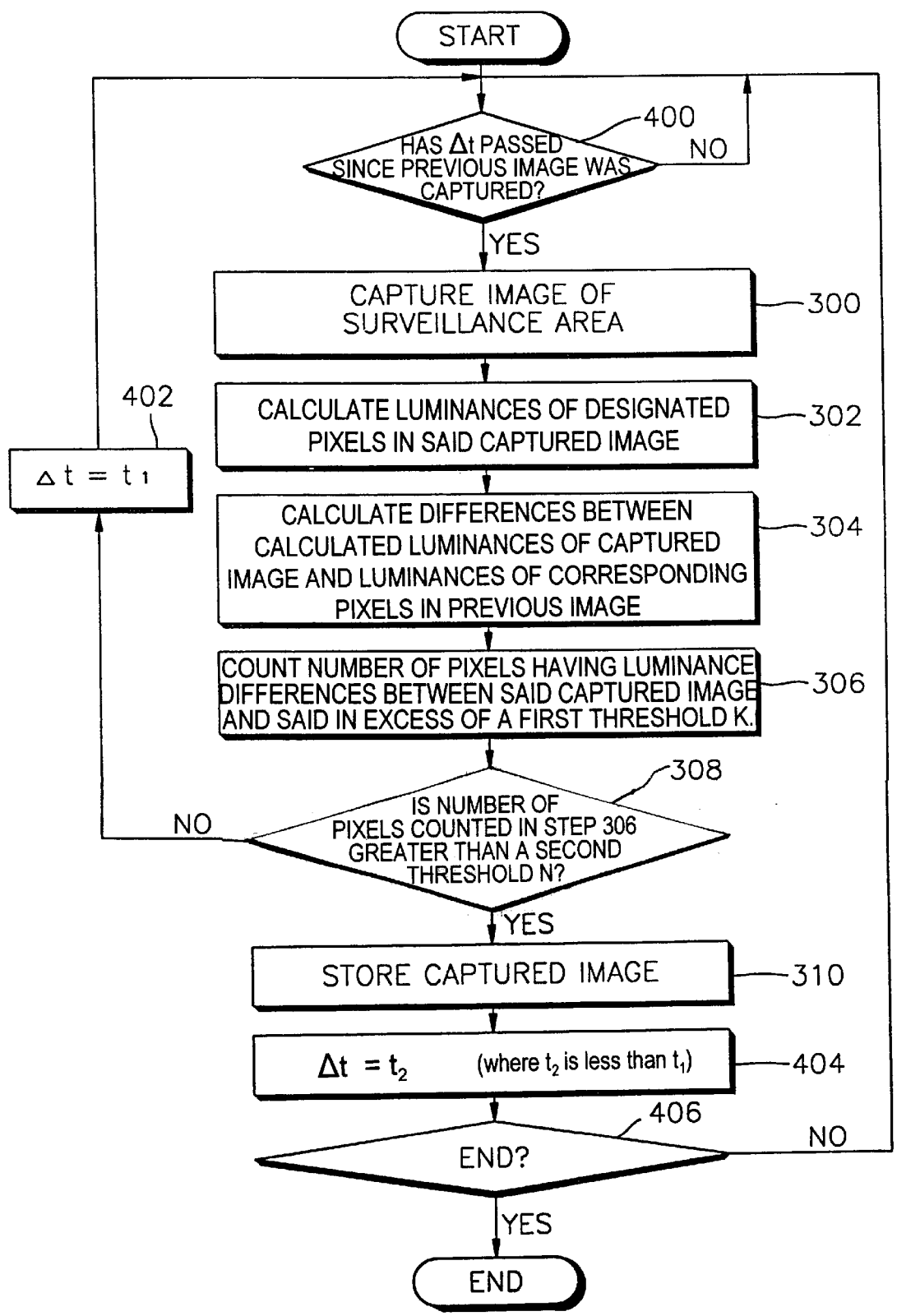
FIG. 4 is a detailed flow chart of the surveillance method illustrated in FIG. 3.

FIG. 4 is a detailed flow chart of the surveillance method illustrated in FIG. 3, and in FIG. 4, the steps 300 through 310 are the same as those of FIG. 3 but FIG. 4 is different from FIG. 3 in that the time Δt between capturing images is variable in FIG. 4 as mentioned previously. The time difference between capturing images is Δt (step 400), and luminance values are found and differences between the found luminance values of user selected pixels of the captured image and those of corresponding user selected pixels of the previous image that is temporarily stored are calculated. Pixels having a calculated difference in luminance larger than a first predetermined value k are counted (steps 300 through 306) and the time interval between captured images Δt is set to $t_1$ (step 402) when the counted number n is smaller than or equal to the second predetermined value N (step 308). In this case, the image only stored in temporary memory 214 overwriting the a previous image previously stored in the temporary memory. When the counted number n is larger than the second predetermined value N (step 308), the time interval between captured images Δt is set to $t_2$ (step 404) after the captured image is stored both in a permanent memory 218 and in temporary memory 214 (step 310). Generally, $t_2$ is smaller than $t_2$ to allow for more images when captured images are in a state of change. Accordingly, images can be stored at shorter intervals when there are more variations in images. If the surveillance operation is stopped (step 406), the process is ended. Although FIGS. 3 and 4 pertain to the scenario where a user selects which pixels in an image are used to determine luminance and eventually whether the captured image is stored, it is to be understood that the user can select every pixel in the image and thus FIGS. 3 and 4 work equally well when every pixel is used in this process instead of just user selected pixels.

What is claimed is:

1. A surveillance method, comprising the steps of:

capturing an image from a camera once every predetermined time interval;

calculating luminance values of pixels in the captured image; counting the number of pixels of a most recently captured image having a sufficiently different luminance value from corresponding pixels of a previously captured image;

permanently storing said most recently captured image when the number of the counted pixels is larger than a predetermined value;

temporarily storing said most recently captured image in a temporary storage unit for comparison with a next, subsequently captured image;

setting said predetermined time interval to a first duration upon permanently storing said most recently captured image prior to capturing a subsequent image; and setting said predetermined time interval to a second and longer duration when said number of counted pixels is smaller than or equal to said predetermined value prior to capturing a subsequent image.

2. The surveillance method of claim 1, the luminance value calculating step is performed only on pixels selected by a user.

3. The surveillance method of claim 1, said luminance being based on a linear combination of intensities of three primary colors experienced by each pixel during image capturing.

* * * * *